Patented June 1, 1937

2,082,304

UNITED STATES PATENT OFFICE 2,082,304

MANUFACTURE OF RUBBER PRODUCTS

Martinus Joännes Stam, The Hague, Netherlands

No Drawing. Application December 10, 1934, Serial No. 756,895

8 Claims. (Cl. 106—23)

My invention relates to the manufacture of rubber or similar products by mixing subdivided rubber or the like with compounding ingredients and a vulcanizing agent, plastifying the rubber and vulcanizing the mixture in a suitable form or condition.

In my copending application Serial No. 706,445 several methods are described in which non-vulcanized rubber, gutta percha, balata or the like is used in the form of a fine dry powder. According to said application the dry powder may be mixed with fillers, vulcanizing agents, accelerators, etc. The mixture is then rendered plastic by rolling, kneading, pressing, or by the addition of a solvent which makes the rubber powder swell and renders it plastic, after which the mixture is molded and vulcanized. By the addition of a swelling agent the powder may also be made into a paste which may be sprayed, plastered or spread in the desired shape and then vulcanized, or a latex like liquid may be prepared from the powder by rendering it plastic and dispersing it in an aqueous liquid. To this latex like liquid additional substances may be added, such as fillers, vulcanizing agents, accelerators, etc. and a plastic and vulcanizable layer may be obtained therefrom by means of filtration or by electrical, mechanical or chemical action. The layer may be deposited on a support or a temporary base and vulcanized. The rubber or similar powder may also be mixed with a dry solid powder which melts below the vulcanization temperature and has then a swelling action on the rubber and preferably a dissolving action on sulphur. An example of such a substance is naphthalene. If napthalene is mixed with rubber powder and sulphur the powder may be pressed into a mould, heated and vulcanized. If all the ingredients are thoroughly mixed and the rubber is sufficiently plastified these processes yield very satisfactory products. The finest rubber powder obtainable by known methods has a particle size exceeding 75$\mu$.

It has now been found that still better products may be obtained and with less plastifying action when a rubber powder of much greater fineness is used. It is to be understood that throughout this specification the word "rubber" also includes gutta-percha, balata, and similar gums, and also artificial and reclaimed rubber if obtained from latices or latex like fluids, everywhere where the sense of the statement does not exclude this broad meaning. By the recent developments of my processes for obtaining unvulcanized rubber powder from latex it has become possible to obtain rubber powder of substantially the same particle size as the globules present in natural or artificial or preserved latex. These globules may agglomerate after drying to loosely agglomerated aggregates, probably due to static electrical forces, but even these are not substantially larger than 75$\mu$. With a rubber powder of the size of the elementary globules of latex or a particle size which is not substantially larger, surprising results may be obtained. As this particle size is smaller or about equal to the size of the finest compounding materials used in rubber manufacture it is possible to obtain a really homogeneous mixture of the dry powders. The complete mixture of all the ingredients may therefore be accomplished by mere mixing in the dry state so that plastifying is not required for obtaining a complete homogeneous mixture as is necessary when a coarse rubber powder is used. It is now possible to form products from the mixture of ingredients by mere pressure and heat. Pressure alone is sufficient to cause the necessary plastification of the rubber. The same effect may be accomplished already by a small percentage of a swelling agent. This plastification is not required for obtaining a homogeneous mixture but only for bringing the rubber particles in contact with each other, so that the rubber may form the homogeneous phase in which the compounding ingredients (fillers) are the dispersed phase.

The powder of extreme fineness used according to the present invention may conveniently be called rubber dust, in distinction with the rubber powder used according to my copending application.

Even as rubber powder this rubber dust consists of particles coated by a substance which prevents premature agglomeration.

According to my invention this rubber dust may be mixed with compounding ingredients in a dry state, whereupon the mixture is rendered plastic, molded and vulcanized. The plastifying may be effected by mere pressure, though, of course, also other mechanical action, such as kneading, masticating, etc. may be used. Another method of rendering the rubber plastic is the incorporation of a swelling agent either in gaseous, liquid or solid form. In the latter case the swelling and plastifying action takes place at elevated temperatures when the swelling agent melts and may be effected in one operation with the vulcanization.

Another manner of incorporating compounding ingredients is the following: The compounding ingredients are first emulsified or dispersed in a liquid. This dispersion, for instance in a swelling agent, may then be mixed with a rubber dust or it may be sprayed therein. In the latter case the dust itself may be atomized or sprayed so that the particles of the rubber dust come into intimate contact with the particles of the dispersion. The materials may be sprayed in the same or in opposite direction. The dust is thus softened, but is still incoherent so that the particles remain separated, as the protective substance is not dissolved from the particles. The mixture may then be pressed into any shape under a low pressure to cause agglomeration of the rubber particles after which it is vulcanized.

The rubber dust is very suitable for preparing a latex like liquid or paste. After a slight plastifying action an aqueous liquid is gradually mixed with the powder in the presence of a dispersion agent. If the rubber powder does not contain such an agent this should be added to the aqueous fluid, or an oil or fat may be added to the rubber powder and an alkali to the aqueous fluid, so that a soap is formed by mixing the ingredients which acts as a dispersing agent.

The rubber powder may also be made into a paste by the addition of a sufficient quantity of a swelling agent or rubber solvent, a vulcanizing agent and compounding materials. This paste may be spread on objects or surfaces and vulcanized on such a temporary or permanent support.

If the rubber powder is mixed with an aqueous fluid, a vulcanizing agent and compounding ingredients in the absence of a dispersing agent, an aqueous paste is formed which may be applied to surfaces and objects and vulcanized. With all these pastes large surfaces can be covered and the covering can be vulcanized on the support.

In order to obtain a sufficient adhering of aqueous vulcanizable pastes to its support, the support to be covered may be first coated with an adhesive for rubber, whereupon the paste is applied and the whole is vulcanized. The adhesive forms an intermediate layer which must be heat proof and after heating adhere strongly to the support and to the covering. Suitable adhesives are for instance a thin layer of asphalt, tar, bitumen or a solution or emulsion thereof, or a solution of rubber, gutta percha, balata or similar substances, or a wholly or partly dissolved layer of rubber dust or the like, or latex may be used as an adhesive, or artificial latex or a latex like fluid, for instance obtained from rubber dust as described above.

If latex or artificial latex is used or a rubber solution it may be mixed with a vulcanizing agent and an accelerator if desired. Adhesives such as asphalt, bitumen and tar may be spread, sprayed or coated as well in diluted or dissolved condition, as in the form of emulsions. They form also a bar against damp and moisture which might exude from the support. Such a layer also adheres strongly to metals if it is applied thereon in heated condition. If the adhesive consists of very diluted solutions of rubber, gutta percha, etc. for instance obtained by dissolving the rubber dust, which is used according to this invention, it is possible to use very mobile liquid adhesives by which the adhering surface and the crystals or particles by which it is formed are completely wetted whereby strongest adhesion is obtained. The adhesives consisting of rubber and the like have the advantage of being vulcanized together with the covering paste.

The following examples may serve to illustrate the invention:

(1)

| | Parts |
|---|---|
| Rubber powder of a particle size of about 0.1–75μ | 100 |
| Carbon black | 40 |
| Zinc oxide (particle size about 1.2μ) | 10 |
| Sulphur (finest powder) | 4 | are thoroughly mixed. The mixture is then pressed to a homogeneous plastic mass by passing it once or a few times between a pair of rollers, is then formed into the desired shape and vulcanized.

(2)

| | Parts |
|---|---|
| Rubber dust passing through a sieve No. 200 | 100 |
| Carbon black | 35 |
| Sulphur | 5 |
| Accelerator | 1 | are thoroughly mixed (all the ingredients being of a size which passes through a sieve No. 200).

This mixture is subjected to hot pressure in a mold which has the form of a shoe sole. A pressure of about 30 tons during a period of 3 seconds is sufficient for obtaining a shoe sole of excellent shape and quality. After leaving the mold the vulcanization is not yet finished but proceeds by the action of the accelerator.

(3) The same ingredients are used as in Example 2, but with the addition of about 5 parts of lubricating oil as a swelling agent. The same process is used but the pressure may be diminished.

(4) 100 parts of benzene are sprayed into a cloud of 100 parts of rubber dust. The dust particles take up the benzene and form swollen particles of great plasticity.

100 parts of these swollen particles are thoroughly mixed with 5 parts of fine divided sulphur, 1 part of an accelerator, and pressed into a mold.

The pressed object is subjected to a temperature of 147° C. under pressure sufficient to prevent evaporation of benzene. After complete vulcanization the object is cooled and the pressure is released; the benzene will now evaporate slowly.

(5) 40 parts of naphthalene and 10 parts of sulphur are melted together and comminuted to an impalpable powder. 50 parts of this powder are thoroughly mixed with 100 parts of rubber dust, molded and subjected while in a closed mold to a temperature of 120° C. for five seconds.

(6) 100 parts of rubber dust are thoroughly mixed with 20 parts of carbon black, 5 parts of zinc oxide and 10 parts of a comminuted mixture of 7 parts of naphthalene and 3 parts of sulphur to which an accelerator has been added. All these ingredients pass through a sieve No. 200.

This mixture is spread in a layer over a brick road which has first been coated by a thin layer of a soft, low melting asphalt and heated under pressure to a temperature of over 100° C. by rolling it with a hot roller.

Roads, such as concrete roads may also be treated without coating or may be coated with a solution of rubber dust in benzene, in which it dissolves much quicker than other forms of rubber.

(7) 100 parts of rubber dust having a particle size of 0.1–75μ are plastified by thoroughly mixing with 100 parts of benzene and 50 parts of oleine while preventing coalescence of the particles. To this mixture are gradually added, while stirring, about 500 parts of water containing 3% of ammonia whereby a latex like fluid is obtained. The benzene is then removed by blowing a stream of hot air through this liquid.

100 parts of this fluid are mixed with 30 parts of carbon black, 3,5 parts of sulphur and 1,5 parts of accelerator.

By means of a suction filter about 50 parts of water are removed from this mixture, whereby a thick paste is left, partly freed from soluble substances derived from the original rubber dust particles. This thick paste is used for coating a fabric and then subjected to vulcanization.

(8) 100 parts of a rubber dust are mixed with 10 parts of ZnO (filler), and 4 parts of sulphur. This mixture is mixed with sufficient gasoline to form a thick paste which is spread on a support and vulcanized under pressure.

(9) 100 parts of rubber dust are mixed with 10 parts of ZnO, 3 parts of sulphur, 1,5 parts of accelerator and 200 parts of water to form a thick paste which is spread on a support and vulcanized. During vulcanization the water evaporates.

The support to which the paste is applied is first coated with a bituminous adhesive or with an adhesive comprising a solution of unvulcanized rubber.

What I claim is:—

1. Manufacture of rubber products, comprising mixing dry rubber dust of a particle size of less than 75µ with dry compounding ingredients of similar size and a vulcanizing agent, plastifying the mixture by compressing and vulcanizing.

2. Manufacture of rubber products comprising mixing dry rubber dust of a particle size of less than 75µ with compounding ingredients of substantially the same size and a vulcanizing agent, subjecting the mixture to the action of a swelling agent, compressing it and vulcanizing.

3. Manufacture of rubber products comprising mixing dry rubber dust of a particle size of less than 75µ with compounding ingredients of substantially the same size, comprising a solid substance capable of melting and dissolving rubber below the vulcanization temperature of a vulcanizing agent, compressing the mixture and vulcanizing it by heating.

4. Manufacture of rubber products comprising mixing dry rubber dust of a particle size of less than 75µ with compounding ingredients of substantially the same size, comprising naphthalene and a vulcanizing agent, compressing the mixture and vulcanizing it by heating.

5. Manufacture of a rubber product, comprising spreading a mixture of rubber dust of a particle size of less than 75µ and compounding ingredients, comprising finely divided naphthalene and a vulcanizing agent over a surface and subjecting the mixture to pressure and heat, thereby obtaining a vulcanized rubber layer on said surface.

6. Method according to claim 5, in which the surface is first coated with an adhesive adhering to said surface and to the rubber layer.

7. Method according to claim 5, in which the surface is first coated with a bituminous adhesive.

8. A method of manufacturing rubber products, comprising mixing about 100 parts of rubber powder in the size of about 0.1 to 75µ, with about 40 parts of carbon black, 10 parts of zinc oxide and 4 parts of powdered sulfur; compressing the mixture to a homogeneous plastic mass and finally forming the mass into desired shape and vulcanizing the same.

MARTINUS JOÄNNES STAM.